United States Patent

Grundl et al.

[11] Patent Number: 5,921,708
[45] Date of Patent: Jul. 13, 1999

[54] PAVEMENT-VEHICLE CONVOY

[75] Inventors: Roland Grundl, Heiligkreuzsteinach; Alfred Ulrich, Gorxheimertal, both of Germany

[73] Assignee: Joseph Voegele AG, Mannheim, Germany

[21] Appl. No.: 08/940,331

[22] Filed: Sep. 30, 1997

Related U.S. Application Data

[30] Foreign Application Priority Data

Oct. 1, 1996 [DE] Germany ............... 296 17 116 U

[51] Int. Cl.$^6$ ............... E01C 23/07; B60T 7/16
[52] U.S. Cl. ............... 404/84.1; 404/84.05; 180/168
[58] Field of Search ............... 404/82, 83, 84.05, 404/101, 112, 84.1, 84.5; 180/167, 168, 169

[56] References Cited

U.S. PATENT DOCUMENTS

| | | | |
|---|---|---|---|
| 3,112,004 | 11/1963 | Neaville | 180/167 |
| 3,235,025 | 2/1966 | Quinn | 180/167 |
| 3,396,811 | 8/1968 | Bowers et al. | 180/167 |
| 3,936,212 | 2/1976 | Holz, Sr. et al. | 404/112 |
| 4,226,552 | 10/1980 | Moench | 404/92 |
| 4,817,000 | 3/1989 | Eberhardt | 364/443 |
| 4,855,656 | 8/1989 | Saitoh et al. | 318/587 |
| 4,979,113 | 12/1990 | Roberts et al. | 364/424.02 |
| 5,036,935 | 8/1991 | Kohara | 180/168 |
| 5,056,612 | 10/1991 | Roumagnac | 180/131 |
| 5,081,585 | 1/1992 | Kurami et al. | 364/424.02 |
| 5,083,629 | 1/1992 | Chang | 180/168 |
| 5,100,277 | 3/1992 | Musil | 414/334 |
| 5,239,249 | 8/1993 | Ono | 318/587 |
| 5,258,961 | 11/1993 | Sehr et al. | 367/96 |
| 5,375,060 | 12/1994 | Nocker | 364/461 |
| 5,387,853 | 2/1995 | Ono | 318/587 |
| 5,549,412 | 8/1996 | Malone | 404/84.1 |
| 5,551,524 | 9/1996 | Yamamoto et al. | 180/6.62 |
| 5,588,776 | 12/1996 | Swisher, Jr. et al. | 404/72 |
| 5,699,040 | 12/1997 | Matsuda | 340/435 |
| 5,767,793 | 6/1998 | Agravante et al. | 340/903 |
| 5,769,051 | 6/1998 | Bayron et al. | 123/335 |
| 5,774,069 | 6/1998 | Tanaka et al. | 340/903 |

FOREIGN PATENT DOCUMENTS

| | | |
|---|---|---|
| 0 667 415 | 8/1995 | European Pat. Off. |
| 2 697 547 | 5/1994 | France |
| 92 04 559 | 5/1992 | Germany |

*Primary Examiner*—Thomas B. Will
*Assistant Examiner*—Gary S. Hartmann
*Attorney, Agent, or Firm*—Nilles & Nilles SC

[57] ABSTRACT

A pavement-vehicle convoy for applying a cover layer of a paving material on a traffic area, such as a roadway. The convoy has at least two independently driven units with at least one of the units being a road-surface finisher and each other unit in the convoy being either a finisher or a charger. One of the units is a command unit that has a remote control used to help maintain a predetermined desired longitudinal distance between the convoy units and which can be used to help maintain a predetermined desired lateral distance from a reference line. The remote control includes a speed correcting device that utilizes signals from a distance sensor on at least one of the units that is used to detect changes from the desired distance so that speed correction signals can be generated and provided to an operation control device on at least one of the units. A remote-control link is provided between the operation control device of the command unit and the operation control device of other convoy units so that operation-related signals can be communicated to a master travel controller that controls a travelling mechanism of the command unit and a travelling mechanism of the other convoy units. Control preferably is effected from the driver's cabin of the command unit to the driver's cabin and operation control device of all other convoy units.

16 Claims, 3 Drawing Sheets

PAVEMENT-VEHICLE CONVOY

BACKGROUND OF THE INVENTION

1. Field of the Invention

The present invention relates to a pavement-vehicle convoy.

For applying cover layers of bituminous or concrete road-surface material, e.g. for applying two-layered cover layers, two or more units are combined so as to form a pavement-vehicle convoy. The smallest pavement-vehicle convoy comprises either two road-surface finisher units or one road-surface finisher unit and an associated charger unit. A mechanical coupling (U.S. Pat. No. 5,100,277) cannot be realized in the case of self-propelled units because, in practice, the respective travelling motions never correspond for geometrical, mechanical and other reasons. Hence, it has up to now been the task of the plurality of drivers to keep the mutual distances between the units constant as far as possible. In pavement-vehicle convoys used in practice the units travelling in convoy are controlled by a corresponding number of very experienced drivers from a respective operating cabin including an operation control device. A so-called travel master controller serves in each unit for switching on and off the drives of the travelling mechanism and all. road-surface applying units. Parameters (travelling speed, adjustment level of the road-surface applying screed, tamper speed and vibration) which have been adjusted prior to a stopover are reproduced automatically and precisely in each unit when the unit starts to move again. Automatic steering systems are used for controlling the direction, said automatic steering systems being adjusted to a reference line. These auxiliary devices make the driver's work easier, but they have not solved the problem of observing the respective distances.

When two-layered or multi-layered cover layers are applied, the distance between the respective road-surface finishers in the pavement vehicle convoy should be kept constant to a very large extent, since, if the distance changes, the temperature conditions for the respective subsequent layer applied will change and noticeably impair the final quality. If at least one charger is included in the pavement-vehicle convoy, it may, due to the presence of this charger, become even more difficult to observe the respective distances especially between the road- surface finishers.

2. Description of the Related Art

EP-A-0 667 415 discloses that, when a road-surface finisher is charged by a truck or a charger vehicle, distance and filling level measurement is used so as to automate the charging operation to a large extent.

Further prior art is contained in FR-A-2697547 (WO9410384A) and DE 9204559.

OBJECTS AND SUMMARY OF THE INVENTION

It is the object of the present invention to provide a pavement-vehicle convoy by means of which a high-quality cover layer can be applied in a largely automated process and with uniform quality.

The whole pavement-vehicle convoy can be controlled from the operating cabin of one unit. The at least one additional unit does not need a separate driver. In the command unit, the various operating parameters are set, e.g. by only one driver or from a separate control centre. Also the start of operation, speed changes and stopping manoeuvres are controlled centrally. The at least one additional unit is guided by the command unit so that the necessary and relevant operating parameters, start of operation or standstill will also be taken into account in the at least one additional unit in real time. Control measures for maintaining the distance can additionally be taken into account in this connection. The quality of the cover layer applied is high and uniform, since inadmissible distance variations are avoided.

In spite of the selection of identical speeds (predetermined target value for the travelling drive), the respective units would perhaps travel at different speeds, although they are remotely controlled, for geometrical, mechanical and hydrostatic reasons and in view of different tractions. According to the present invention, the speed correcting device overrules by means of the distance sensor the remote control so as to maintain the predetermined distance.

It will be expedient when each unit of the units constituting the pavement-vehicle convoy can selectively be adjusted such that it serves as a command unit. The structural preconditions and the preconditions in the field of circuit technology which are required for the command-unit function can be provided in the case of each unit. It will, however, be expedient to assign the command-unit function to the unit playing a leading role in the pavement-vehicle convoy with regard to the quality of the cover layer applied.

Preferably, the remote control is used for transmitting all the necessary operating parameters to all units. The speed correcting device acts on the respective individual unit which is not the command unit. The speed correction serves to keep the distance between the respective units constant. The other operating parameters may remain uninfluenced by this correction.

In accordance with a particulary expedient embodiment, the speed can be controlled such that the distance between two respective units remains constant. The instantaneous target value from the command unit is only a reference value in the control operation which is carried out sensitively in response to upcoming or measured distance variations. This is easily possible by increasing or reducing the target value depending on whether the distance tends to become larger or smaller.

From the point of control technology, the solution of the problem does not require a high expenditure.

Distance sensors will be suitable elements for monitoring the distance variations and for deriving strong useful signals from distance variations.

In accordance with a simple structural design, the cable harness is installed such that it extends from the operating cabin of the command unit to each operating cabin of respective further units.

Alternatively, wireless signal transmission can be carried out with one or more transmitters and with a corresponding number of receivers on the other units.

An expedient pavement-vehicle convoy serves to apply a two-layered cover layer, the intermediate distance between the two road-surface finishers being kept constant. If the front road-surface finisher is the command unit, the travelling speed of the rear road-surface finisher will be increased if the distance becomes longer and reduced if the distance becomes smaller. If the rear road-surface finisher is the command unit, the speed of the front road-surface finisher will be reduced if the distance becomes longer and increased if the distance becomes smaller.

If a charger is additionally used, a constant distance is maintained between the road-surface finisher and the charger by means of remote control so as to guarantee that the road-surface finisher has permanently supplied thereto road-surface material in an appropriate manner and so as to avoid disturbances in the process of applying said road-surface material.

In the case of an expedient pavement-vehicle convoy, a dual charger charges two road-surface finishers travelling behind said dual charger, the distance between said road-surface finishers and the distance between the front road-surface finisher and the charger being kept constant and the application of the road-surface material being controlled from a single operating cabin.

In a pavement-vehicle convoy comprising four units, said four units can all be controlled from one operating cabin, the distances between the respective units being kept constant. The two front road-surface finishers can be charged from trucks in a conventional manner. In the case of the road-surface finisher travelling behind, this is not possible so that this road-surface finisher is supplied with road-surface material from the charger travelling between the two front road-surface finishers, said road-surface material being passed above the road-surface applying screeds of the two front road-surface finishers.

In accordance with the present invention, a driver is only required in the operating cabin of the command unit. Parameter values that are relevant with regard to the charger are transmitted by the remote control system.

In accordance with an expedient embodiment, the units in the pavement-vehicle convoy are guided along the reference travelling line by means of the automatic steering systems.

The charger can orient itself by the road-surface finisher travelling beside it so that an optimum alignment with regard to the road-surface finisher to be charged will always be observed as well.

BRIEF DESCRIPTION OF THE DRAWINGS

Embodiments of the subject matter of the present invention will be explained on the basis of the drawings, in which.

DESCRIPTION OF THE PREFERRED EMBODIMENTS

Figure 1:
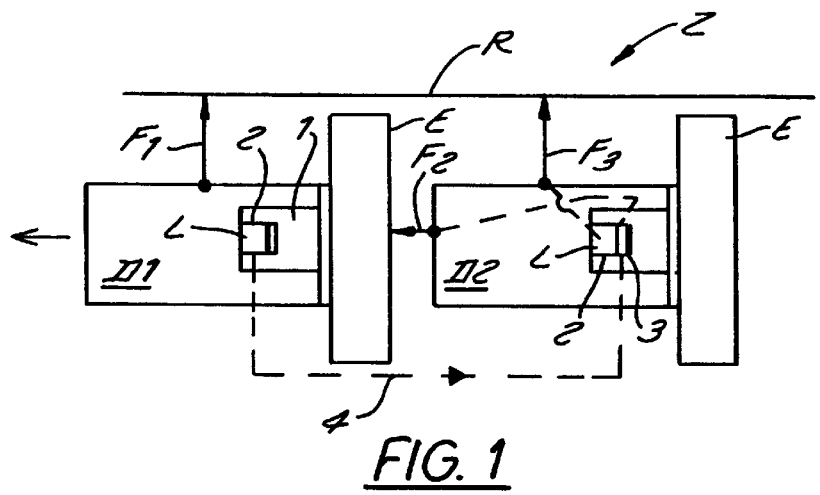
FIG. 1 shows schematically and in a top view a first embodiment of a pavement-vehicle convoy.

The various embodiments explained hereinbelow are only a small selection. Embodiments of details are only schematically shown and explained such that the basic concept of the invention becomes sufficiently understandable. Details in the field of control engineering and circuit engineering are also shown and explained in a simplified manner and can be realized in practice in a clearly modified and more complex form.

The pavement-vehicle convoy Z for applying a two-layered cover layer of bituminous or concrete road-surface material (FIG. 1, 5 and 6) consists of at least two road-surface finishers D1 and D2 travelling along a reference travelling line R at a predetermined distance Y from each other. Each road-surface finisher D1, D2 comprises a driver's cabin 1 including an operation control device 2, which has integrated therein e.g. an automatic steering system L, and drags a road-surface applying screed E with road-surface applying units (FIG. 5), e.g. a tamper device 12. At least in the case of the operation control device 2 of the rear road-surface finisher D2, a speed correcting device 3 is provided, which is operationally connected to a distance sensor F2 monitoring the distance Y and generating in response to variations of this distance positive or negative correction signals for the speed correcting device 3 among other components. The operation control device 2 and the speed correcting device 3, respectively, of the rear road-surface finisher D2 are connected to the operation control device 2 of the front road-surface finisher D1 via a signal transmission path 4. The signal transmission path 4 can be a cable harness. Alternatively or additively, it is possible to provide wireless signal transmission, e.g. by means of a transmitter 24 and a receiver 25 according to FIG. 7.

Figure 6:
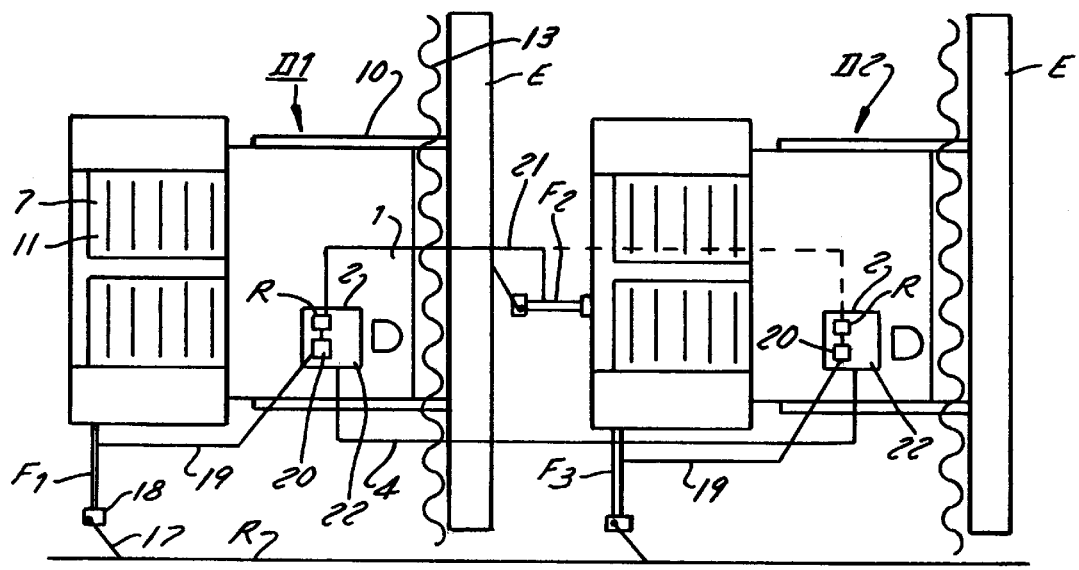
FIG. 6 shows, in an enlarged representation, an associated top view of FIG. 5.

The pavement-vehicle convoy Z according to FIG. 1, 5, 6 is steered from the driver's cabin 1 of the front road-surface finisher D1 which serves as command unit (in FIG. 1 underlined). The operating parameters for the rear road-surface finisher D2 are transmitted e.g. via the signal transmission path 4, e.g. a target value for the travelling speed, the adjustment level of the road-surface applying screed E, the tamper speed, the vibration of the road-surface applying screed E and the like. It is, however, also possible to adjust individual operating parameters for the rear road-surface finisher or rather for each road-surface finisher individually. Also the instruction to start or to stop as well as to switch the road-surface applying units on and off is transmitted by remote control. If the target value for the travelling speed of the rear road-surface finisher D2 should have the effect that the speed of said rear road-surface finisher is, permanently or only temporarily, too high or too low, the distance sensor F2 will become active, the correction signals of said distance sensor F2 being taken into account in the speed correcting device 3 so as to keep the distance Y constant. The distance sensor F2 is, for example, an angle encoder (explained on the basis of FIG. 6).

For guiding both road-surface finishers D1, D2 along the reference travelling line R, distance sensors F1 and F3 are used, which transmit correction signals to the respective automatic steering system L. A driver is, in principle, only required in the driver's cabin 1 of the front road-surface finisher D1.

Figure 3:
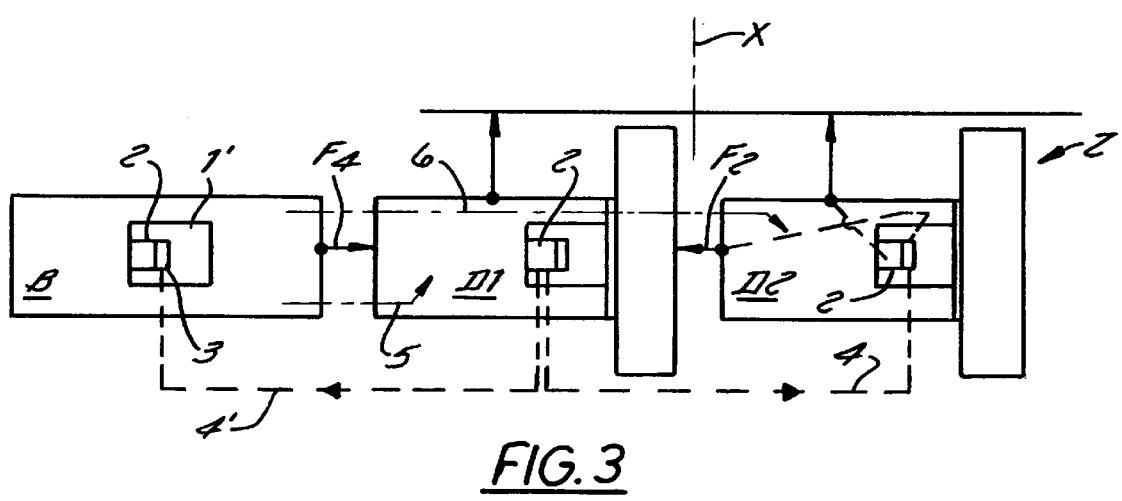
FIG. 3 shows a further embodiment of a pavement-vehicle convoy.
Figure 5:
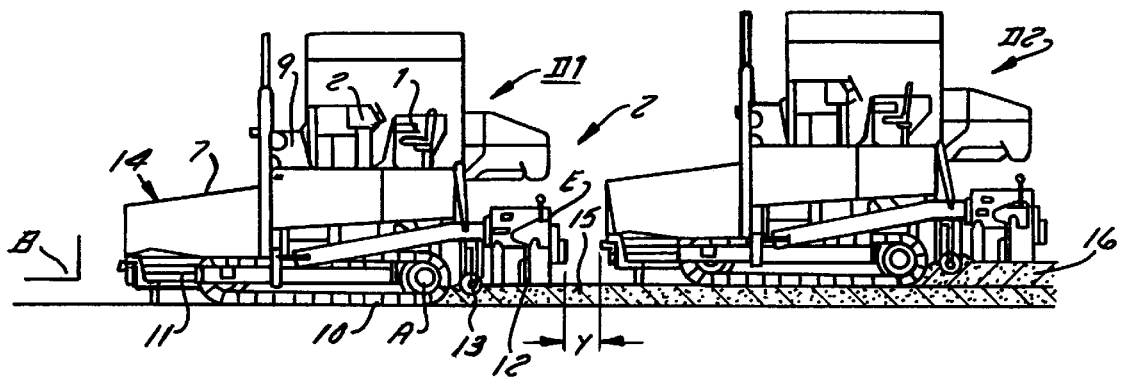
FIG. 5 shows a side view of a pavement-vehicle convoy.

In FIG. 5, the charger B shown in the embodiment of the pavement-vehicle convoy Z according to FIG. 3 is also outlined ahead of the front road-surface finisher D1 constituting the command unit also in this pavement-vehicle convoy Z.

Each road-surface finisher D1 comprises in a chassis 8 a front bunker 7 for the road-surface material 14. A longitudinal conveyor 11 arranged in said chassis 8 conveys the road-surface material to the rear to a location in front of the road-surface applying screed E and to a transverse distributor device 13 at the rear end of the chassis (which is normally a screw means). The chassis 8 travels on a travelling mechanism 10 (wheel or tracklaying gear) which is driven by one or by two drive units A. In the driver's cabin 1 of the road-surface finisher D1, the operation control device 2 is provided from which e.g. a cable harness 4 leads to the driver's cabin of the rear road-surface finisher D2. The front road-surface finisher D1 applies a first layer 15 onto which the rear road-surface finisher D2 applies a second layer 16.

According to FIG. 6, the distance sensors F1, F2, F3 are angle encoders comprising a sensing element 17, which is adapted to be displaced by an angular movement and which is attached to a signal-generating member 18. The distance sensor, e.g. F1, is adjusted to a predetermined distance (e.g. from the reference travelling line R). If the actual value of said distance corresponds to the target value, the distance sensor F1 will not produce any correction signal. If the actual value changes in comparison with the target value, the distance sensor F1 will provide positive or negative correction signals. The other distance sensors F2 and F3 are of a similar nature. Alternatively, also linear stroke decoders or ultrasonic, radar or laser sensors could be used as distance sensors. The distance sensor F1 is connected via a signal line 19 to a travel master controller or a travelling drive control 20 in the operation control device 2, so is the distance sensor F3 of the rear road-surface finisher D2. The distance sensor F2, which monitors the distance between the front end of the rear road-surface finisher D2 and the rear of the a road-surface applying screed E of the front road-surface finisher D1, is connected via a signal line 21 e.g. to a travelling-speed control unit R' in the operation control device 2 of the front road-surface finisher D1 used as a command unit in the present case.

Figure 2:
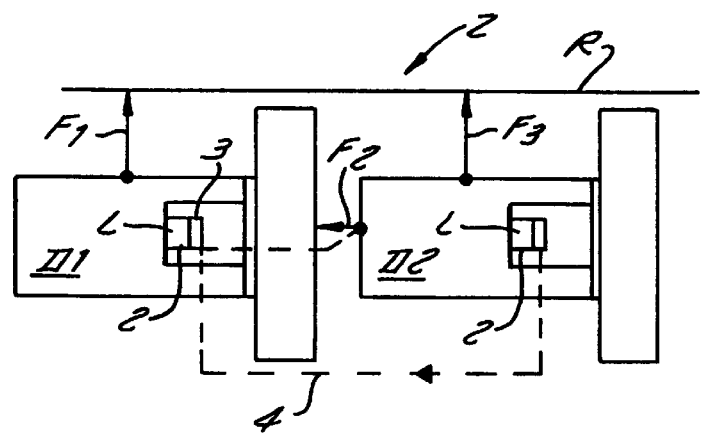
FIG. 2 shows an embodiment which has been modified in comparison with FIG. 1.

In the pavement-vehicle convoy Z according to FIG. 2, the rear road-surface finisher (underlined) is the command unit. From the operation control device 2 of said road-surface finisher, the signal transmission path 4 also leads to the speed correcting device 3 of the front road-surface finisher D1. The distance sensor F2 is connected to the speed correcting device of the front road-surface finisher D1. In this case, it will be expedient to arrange the distance sensor F2 on the front road-surface finisher D1. In FIG. 6, this arrangement according to FIG. 2 (rear road-surface finisher D2 as command unit) is symbolized by the broken line connecting the distance sensor F2 and the control means R" of the rear road-surface finisher D2.

The pavement-vehicle convoy Z according to FIG. 3 differs from the above-mentioned pavement-vehicle convoys with regard to a charger B which travels ahead of the front road-surface surface finisher D1 in spaced relationship therewith and which is implemented e.g. as a dual charger supplying via conveyors 5, 6, which are outlined by a dot-and-dash line, the front road-surface finisher D1 as well as the rear road-surface finisher D2 with road-surface material (of the same kind or of different kinds). The front road-surface finisher D1 is the command unit which, for the purpose of remote control, is connected to the rear road-surface finisher D2 via the signal transmission path 4 and to the charger B via a further signal transmission path 4'. Also the charger B has an operation control device 2 provided in its driver's cabin 1', said operation control device 2 being equipped with a speed correcting device 3 having connected thereto the signal transmission path 4'. In addition, a further distance sensor F4 is provided, which is attached to the charger B in an expedient manner and which is connected to the speed correcting device 3 so as to keep the distance between the charger B and the front road-surface finisher D1 constant.

The dot-and-dash line X in FIG. 3 indicates that the pavement-vehicle convoy Z may also comprise only the charger B and the front road-surface finisher D1.

Figure 4:
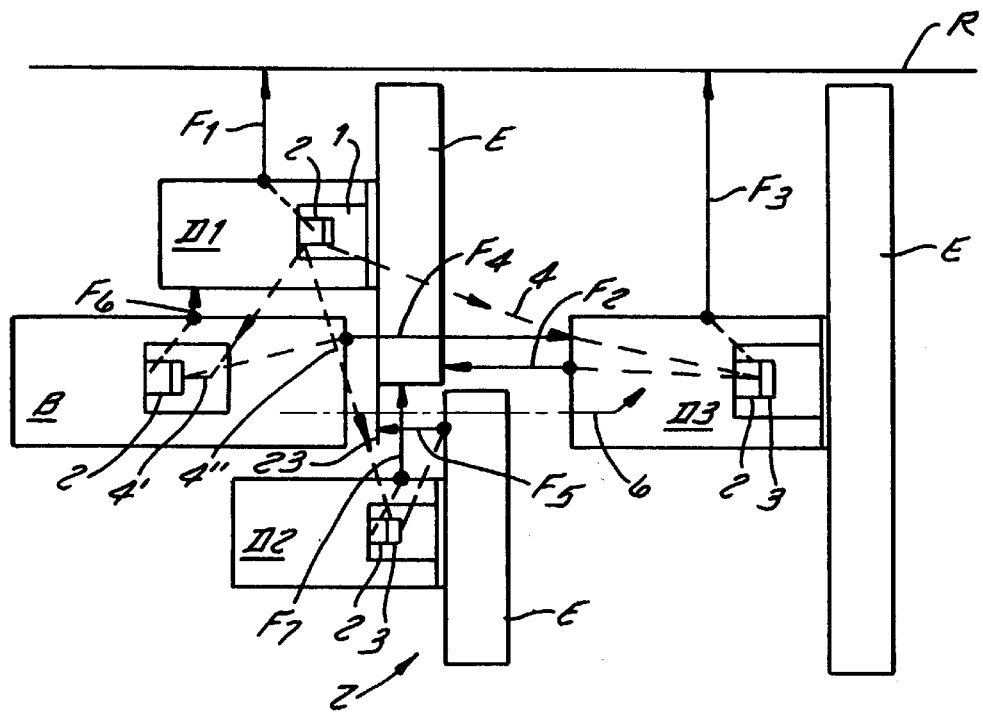
FIG. 4 shows a further embodiment of a pavement-vehicle convoy.

The pavement-vehicle convoy Z according to FIG. 4 is designed for installing two layers of road-surface material and consists of two front road-surface finishers D1 and D2 travelling next to one another but in displaced relationship with one another and of a third road-surface finisher D3 travelling behind the two first-mentioned ones approximately in the middle thereof; the road-surface applying screed E of said third road-surface finisher D3 extends over the-whole width of the cover layer. In addition, the charger B travels between the two front road-surface finishers D1, D2, said charger B supplying by means of a conveyor 6 outlined by a dot-and-dash line the rear road-surface finisher D3 with road-surface material which is passed above the road-surface applying screeds E of the two front road-surface finishers D1, D2. The two front road-surface finishers D1, D2 are either charged by trucks in a conventional manner or by the charger B or by other chargers.

The road-surface finisher D1 is the command unit which remotely controls the two other road-surface finishers D2, D3 and the charger B via signal transmission paths 4, 4' and 4". A distance sensor F2 arranged e.g. on the rear road-surface finisher D3 monitors the distance of said rear road-surface finisher D3 from the road-surface applying screed of the front road-surface finisher D1. A further distance sensor F4 arranged e.g. on the charger B monitors the distance of said charger B from the rear road-surface finisher D3, said distance being monitored in the direction of motion. A distance sensor F5 arranged on the front road-surface finisher D2 monitors the distance of said front road-surface finisher D2 from a reference element 23 of the front road-surface finisher D1. Lateral distance sensors F1 and F3 and F7 are coupled to the respective automatic steering system. The charger B is guided beside the front road-surface finisher D1 by means of a further distance sensor F6.

Figure 7:
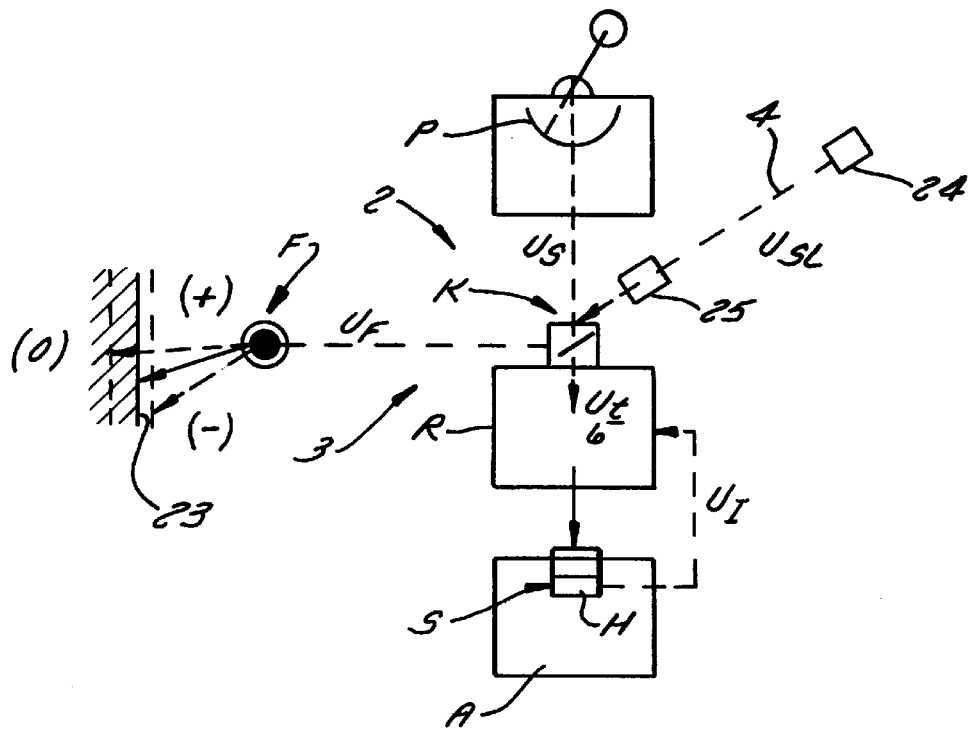
FIG. 7 shows a schematic representation of a control principle.

FIG. 7 clearly shows in a schematic representation a speed correcting device 3 coupled to an operation control device 2 of e.g. the rear road-surface finisher D2 in FIG. 1.

For automatically controlling the operating speed of a road-surface finisher (without remote control) a target value Us for the travelling speed is adjusted by means of a travel control lever. This target value is applied to a controller R'" actuating an actuator element S of e.g. a hydraulic motor H so as to adjust the travelling speed. The actual travelling speed $U_I$ is detected and transmitted to the controller R'". The controller R'" takes care that the actual travelling speed is adapted to the target travelling speed.

The distance sensor F is adjusted to the specific distance Y from the reference element 23. If the distance is correct, the distance sensor F will not produce any signal (0). The controller R'" operates on the basis of $U_S$ and $U_I$. If the distance becomes larger, the distance sensor F will produce a positive correction signal $U_F$ (e.g. a voltage level) that is evaluated in a correction circuit K which will increase the target value Us for the controller R'" so as to accelerate the road-surface finisher until the distance Y is reestablished.

If the distance becomes shorter, the distance sensor F will produce a negative correction signal $U_F$ which will be evaluated by the correction device K so as to reduce the target value $U_S$ for the controller R'". The controller R'" controls the actuator element S accordingly.

For operating the road-surface finisher D2 by remote control, the signal transmission path 4 is connected e.g. to the target-value transmission path leading to the correction device K, said signal transmission path 4 being connected e.g. in the form of a cable harness or in wireless form (transmitter 24 and receiver 25). The target value $U_{SL}$ from the command unit is present at the correction device K and is taken into account by the controller R'". In the correction device K also the signals of the distance sensor F are taken into account so as to reduce or increase the target value $U_{SL}$ in accordance with distance variations. It will be expedient to passivate the speed control of the remotely controlled road-surface finisher in this operating phase.

In the case of a modified embodiment, the operation control device 2 of the command unit could receive, evaluate and process the corrections signals of all distance sensors that are effective in the direction of motion so that the speeds of the additional units can be controlled from said command unit in such a way that the distances remain constant. All the distance sensors effective in the direction of motion may then possibly be applied to the command unit. Preferably, the automatic steering system of the command unit may even control the automatic steering systems of the other units directly.

We claim:

1. A pavement-vehicle convoy for applying a cover layer of a bituminous or a concrete road-surface material on a traffic area, said convoy comprised of at least two independently driven units adapted to be driven in said convoy, at least one of said units being a road-surface finisher unit and at least one other of said units being either a road-surface finisher unit or a charger unit, wherein at least one of said units in said convoy comprises a command unit for at least one other of said units in said convoy for remotely controlling operation of said at least one other of said units in said convoy by a remote control, wherein said remote control includes a speed correcting device disposed on-board at least one of said units and associated with at least two respective said units of said convoy spaced a predetermined distance apart with one of said respective said units disposed forwardly of the other one of said respective said units, said speed correcting device including a distance sensor that detects variations in said predetermined distance and generates speed correction signals for at least one of said at least two respective said units, each one of said at least two respective said units having an on-board operation control device, travelling-drive actuator elements, and regulating or actuating elements of an on-board secondary drive unit and a remote-control signal transmission path provided between said operation control device of said command unit and said operation control device of said at least one other of said units, said speed correcting device coupled to said operation control device of one of said at least two respective said units, and wherein said signal transmission path permits communication of at least one signal related to at least one of a travelling speed, an adjustment level of a road-surface applying screed, a tamper speed, a tamper vibration, and a power of heat applied to said cover layer, which is utilized by a travel master controller that controls a travelling mechanism of said command unit and said travelling mechanism of said at least one other of said units from said command unit to said operation control device of said at least one other of said units.

2. A pavement-vehicle convoy as recited in claim 1 wherein said travel master controller controls said travelling mechanism of said command unit and said travelling mechanism of said at least one other of said units from said driver's cabin of said command unit to said driver's cabin and said operation control device of said at least one other of said units.

3. A pavement-vehicle convoy as recited in claim 1 wherein any one of said units in said convoy is capable of comprising said command unit.

4. A pavement-vehicle convoy as recited in claim 1, wherein each one of said units in said convoy further comprises means for transmitting a target-value disposed between said operation control device and said travelling-mechanism actuator elements, said remote-control signal transmission path of said command unit and said distance sensor being connected to said target-value transmission means of said unit in order vary an instantaneous target value for said travelling-mechanism actuator elements of said unit proportionally to variations from said predetermined distance in response to said correction signals.

5. A pavement-vehicle convoy as recited in claim 1, wherein said target value is formed from an electric voltage value representative of a specific travelling speed selected by use of a potentiometer and wherein said correction signals are capable of varying said electric voltage value.

6. A pavement-vehicle convoy as recited in claim 1 wherein said distance sensor comprises one of a rotational-angle sensor, a linear stroke decoder, an ultrasonic sensor, a radar sensor, and a laser sensor, said distance sensor being disposed on one of said units in said convoy and being in alignment with an associated reference element disposed on another of said units in said convoy.

7. A pavement-vehicle convoy as recited in claim 6 wherein said reference element is affixed to said command unit.

8. A pavement-vehicle convoy as recited in claim 1, wherein each one of said signal transmission paths comprises a cable harness connecting said command unit to another one of said units in said convoy.

9. A pavement-vehicle convoy as recited in claim 1, wherein said signal transmission path comprises of a wireless transmitter disposed on said command unit and a wireless receiver disposed on another of said units in said convoy.

10. A pavement-vehicle convoy as recited in claim 1, wherein said convoy includes at least two road-surface finisher units travelling one behind another with said predetermined distance comprising the distance between said command unit and another of said units equipped with said speed correcting device.

11. A pavement-vehicle convoy as recited in claim 1, wherein said convoy includes a charger unit travelling in front of at least one road-surface finisher unit travelling with said road-surface finisher unit comprising said command unit.

12. A pavement-vehicle convoy as recited in claim 1, wherein said convoy consists of a dual charger unit travelling in front of two road-surface finisher units travelling behind said dual charger unit with one of said of road-surface finisher units comprising said command unit.

13. A pavement-vehicle convoy as recited in claim 1, wherein said convoy includes first and second road-surface finisher units travelling side-by-side and offset from each other and further includes a third road-surface finisher unit travelling behind both of said first and second road-finisher units about in the middle thereof, and further including a charger unit for said third road-surface finisher unit, said charger unit travelling in front of said third road-surface finisher unit and between said first and second road-surface finisher units, one of said first and second road-surface finishers comprising said command unit and said remaining units each equipped with said speed correcting device for helping maintain said predetermined distance between each other.

14. A pavement-vehicle convoy as recited in claim 13, wherein said charger unit is equipped with an automatic steering system that is adjusted using a distance sensor sensing a reference line beside said charger unit.

15. A pavement-vehicle convoy as recited in claim 1 wherein said reference line is defined by at least one of said first and second road-surface finisher units travelling beside said charger unit.

16. A pavement-vehicle convoy as recited in claim 1, wherein each of said units in said convoy is equipped with an automatic steering system adjusted to a reference travelling line with the aid of at least one distance sensor.

\* \* \* \* \*